Dec. 8, 1936.              G. MISSIAEN              2,063,327
                    PIE LOOSENER, CUTTER, AND REMOVER
                         Filed April 9, 1934
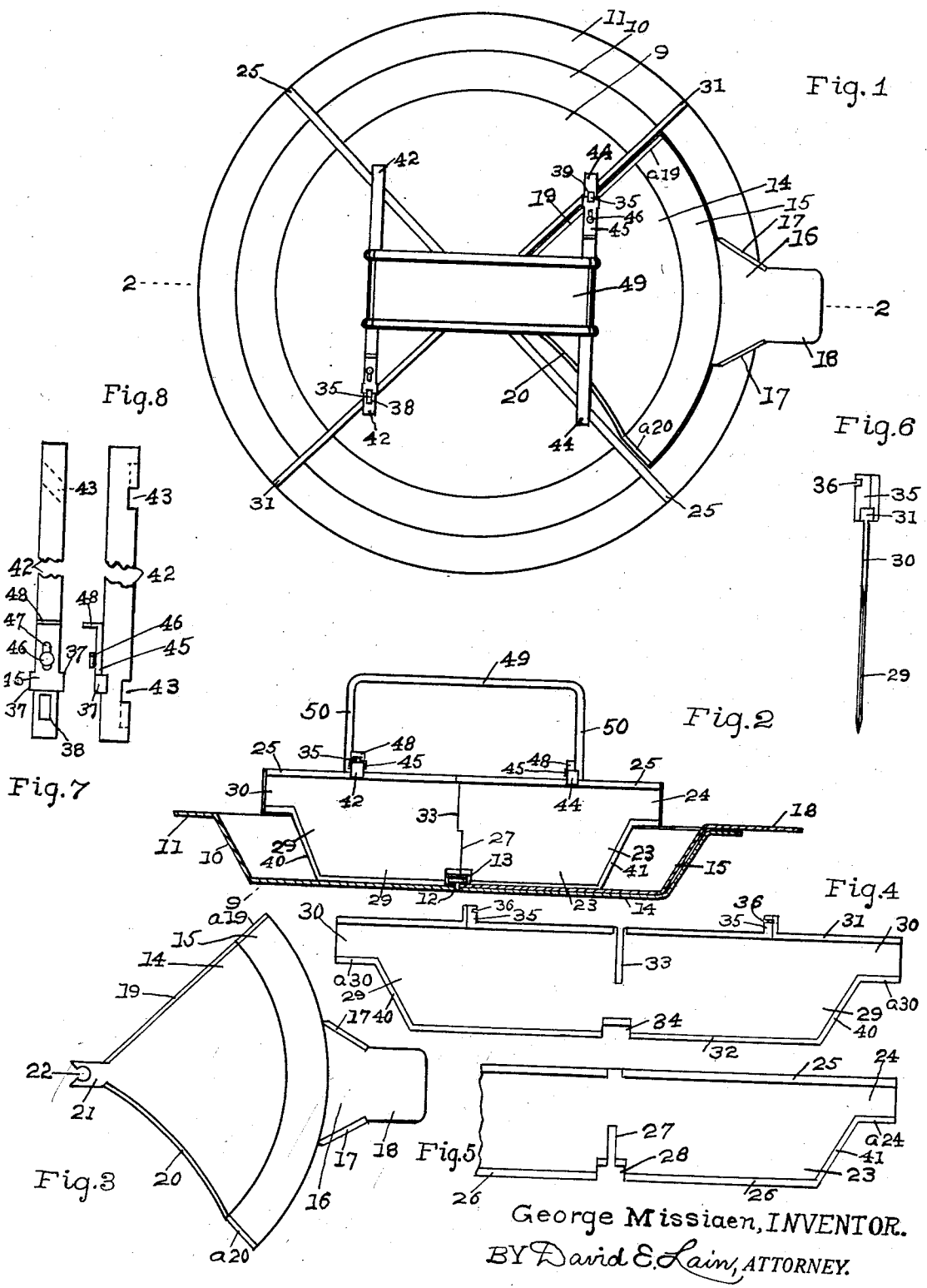
George Missiaen, INVENTOR.
BY David E. Lain, ATTORNEY.

Patented Dec. 8, 1936

2,063,327

UNITED STATES PATENT OFFICE 2,063,327

PIE LOOSENER, CUTTER, AND REMOVER

George Missiaen, Bellingham, Wash.

Application April 9, 1934, Serial No. 719,625

1 Claim. (Cl. 146—206)

My invention relates to improvements in combined pie looseners, cutters and removers, and has for an object to combine these instrumentalities into a cooperative device in which each contributes a useful part of the desired resultant and without which the entire objective would not be attained.

Another object of my improvement is to provide the loosener of the combination with a particular shape of separating edge well suited for the purpose intended.

Another object of my improvement is to provide a separable cutter with simple fastening means adapting the cutter for being separated for cleaning, sharpening and polishing.

Other objects of my improvement will appear as the description proceeds.

I attain these and other objects of my invention with the device illustrated in the accompanying sheet of drawings, which forms a part of this specification, in which Figure 1 is a plan view of a pie tin with my combined pie loosener, cutter and remover in place therein. Fig. 2 is a side elevation of Fig. 1 in which the pie tin and loosener and remover are shown in section on the line 2—2 of Fig. 1, Fig. 3 is a segregated plan view of the loosener and remover, Fig. 4 is a side elevation of the holder blade of the cutter, Fig. 5 is a side elevation of the other blade of the cutter one end of which is broken away, Fig. 6 is an end elevation of the holder blade drawn on a larger scale, Fig. 7 is a plan view of one of the two similar cutter bars shown segregated and with the central part thereof broken away, and Fig. 8 is a side elevation of Fig. 7.

Similar characters refer to similar parts throughout.

With more particular reference to the designated parts: The pie tin 9 is the ordinary, standard four-piece pie tin with flat bottom, slanting side walls 10 and flange 11. For the present use the headed stud 12, 13 is fastened in the center of the plate or tin bottom with the head 13 spaced apart therefrom.

The pie loosener and remover 14 is segmental and has the bottom part 14 disposed on the pie tin bottom, the slanting side wall 15 fitted to and disposed against the wall 10 of the pie tin and the handle 18 fastened to the wall 15 and disposed flatwise on the pie-tin flange 11 and extended beyond the flange to provide a finger hold. The handle 18 has the shank 16 to overlie the flange 11, and this shank is provided with the inclined sharpened edges 17, 17. The right-hand edge 19 of the segmental loosener and remover, preferably, is straight and sharpened, while the left-hand edge 20, preferably, is arcuate and sharpened. The extension 21 at the vertex of the loosener and remover has the circular notch 22 therein to engage the pivotal stud 12 in the pie tin bottom.

The cutter knife 23 is shaped to fit a diameter of the pie tin with the bottom sharpened edge 26 bearing on the pie tin bottom, the inclined end sharpened edges 41 bearing on the inclined walls 10 and the ends 24 extended over the flange of the pie tin with the sharpened edges a24 thereof bearing on the said pie tin flange. The knife 23 has the central notch 28 in its bottom edge to avoid contact with the stud head 13 and a narrower deep notch 27 extended to the transverse center of the knife. The knife 23 is strengthened and stiffened by the enlarged top edge 25 thereon.

The cutter knife 29 also is shaped to fit a diameter of the pie tin and has the straight bottom sharpened edge 32 to bear on the pie tin bottom, the slanting end sharpened edges 40 to bear on the walls 10 of the pie tin and the extended ends 30 with sharpened lower edges a30 to bear on the pie tin flange 11. Centrally disposed in the bottom edge 32 of the knife 29 is the notch 34 to avoid contact with the stud head 13, and centrally disposed in the top edge of the knife 29 is the narrow notch 33 extended to the transverse center of the knife. The knife 29 is strengthened and stiffened by the enlarged top edge 31 on which are fastened the studs 35, 35 each having a notch 36 therein.

The knives 29 and 23 are disposed at right angles in the pie tin, as shown in Figs. 1 and 2, with the notch 33 engaging the knife 23 and the notch 27 engaging the knife 29 causing the knife 29 to serve as a stop from farther movement downward to the knife 23, and when the knife 29 is retained the knife 23 is retained thereby from movement downward out of registry with the knife 29.

The handle bars 43 and 44 are similar and are placed on top of the knives 23 and 29, when the latter are disposed at right angles in the pie tin and engaged with each other by the notches 27 and 33, as shown in Figs. 1 and 2, with the diagonal notches 43 in the bottom surfaces of the bars engaged by the backs 25 and 31 of the knives and the holes 38 and 39 in the bars having the studs 35 and 36 extended therethrough.

The handle 49 has the shanks 50, 50 the ends of which are fastened to the handle bars 42, 44, disposing the said bars in the related positions with the knives 23, 29 shown in Figs. 1 and 2.

The latches 45, 45 are mounted for reciprocation near the openings 38 and 39 through the handle bars 42, 44. Each of the said latches has the slot 47 longitudinally thereof and the side clips 37, 37 to embrace one of the handle bars. A headed stud 46 is extended through each of the slots 47 and fastened in the upper side of one of the handle bars disposed to allow the outer end of the latch to pass over the inner end of one of the openings 38 or 39. This stud cooperates with the clips 37, 37 in engaging the latch on the top side of the handle bar for reciprocation. When the handle bars are engaged with the studs 35, 35, as shown in Figs. 1 and 2, an outward movement of the latches will engage them in the notches 36 in the studs 35 and prevent the withdrawal of the bars 42, 44 from the engaging studs 35 and the engaged notches 43 and retain the handle 49 fastened on the blades 23, 29; for, although the blade 23 is engaged to the bars 42, 44 by the notches 43 only, the blade 23 is carried by the blade 29 as above explained.

The construction provides a secure fastening of the handle 49 on the blades 23, 29 by the latches 45. And the said handle and blades may be separated by withdrawing the said latches from engagement with the studs 35 when the bars 42, 44 may be disengaged from the said blades.

The segmental remover 14 is somewhat smaller than the quadrants of the pie pan as defined by the assembled blades and handle, and may occupy any one of the said quadrants of the pan.

In operation: The pie remover 14 remains in place in the pie pan when the pie is made therein and baked. To remove one or more quarters of the baked pie from the pan, the remover is first caused to revolve about the pivot 12, preferably toward the left, one complete revolution during which the sharpened edges 20, a20 sever the bond between the bottom and side walls of the pie pan and the bottom pie crust, and at the same time one of the diagonal sharpened edges 17 of the handle shank 16 severs the bond between the edge of the pie crust and the flange 11 of the pie pan. During this operation the concave edge 20 and the diagonal edge 17 are more effective in severing the said bond and do the work with less crumbing of the crust than if they were straight because of the "drawing" character of the moving cutting edges. The pie is now loosened from the pie tin and may be removed whole if desired.

When it is desired to divide the pie into four pieces, the assembled knives and handle, fastened together as explained above, are applied to the pie, taking care to dispose the cutting blades to include the pie remover 14 within one of the cutter quadrants. By forcing the blades to the bottom of the pie pan the pie is cut into four equal regular pieces, one of which may be removed by lifting out the remover 14 which carries the piece away from the pan with it.

If no further pieces of the pie are required at this time, the remover may be returned to the vacant quadrant in the pie pan, and the knives may remain in place in the pan and pie till the next piece of the pie is desired. To allow the knives to remain is especially desirable, if the filling of the pie is of a soft flowing character, in which case the said filling is retained in place between the pie crust and is quite entirely removed by the remover 14 when the next piece of pie is desired. To remove the second and other remaining pieces of pie, the blades are somewhat lifted to allow the remover to pass beneath and occupy another quadrant between the same.

If the cutter and remover are desired for use in larger pie pans and the pies therein are to be cut in six or eight pieces, for instance, three or four blades, respectively, are used in the cutter and the remover is made accordingly to fit the segments therebetween.

Besides the advantages of evenly, equally cut pies provided for by my cutter, the removing and disposition of the pieces by my pie remover is attained without need of contacting the fingers with the pie.

The described provision for separating the knives from the assembled cutter is important when cleaning and scouring the same.

Having thus disclosed my invention, what I claim as new therein and desire to secure by Letters Patent is,—

A segmental pie loosener and remover disposed on the bottom of a pie tin having a notch in its vertex engaging a centrally disposed stud in the said pie tin bottom, a straight radial edge and a sharpened arcuate edge, a slanting sidewall fastened to the end of the loosener and remover having cutting edges disposed against the side walls of the pie tin, and a relatively narrow handle having cutting edges fastened to the top of the side wall disposed flatwise on top of the pie tin flange.

GEORGE MISSIAEN.